United States Patent [19]
Nakajima et al.

[11] Patent Number: 5,469,008
[45] Date of Patent: Nov. 21, 1995

[54] MOTOR WITH A BEARING LUBRICATED BY MAGNETIC FLUID

[75] Inventors: Takeshi Nakajima; Ichiro Hashimoto; Tomoyuki Saitou; Fusanori Ohira; Sueo Akashi; Nobukatu Sone; Katsutoshi Nii, all of Hitachi, Japan

[73] Assignee: Hitachi, Ltd., Tokyo, Japan

[21] Appl. No.: 165,451

[22] Filed: Dec. 13, 1993

[30] Foreign Application Priority Data

Dec. 11, 1992 [JP] Japan .................... 4-331377

[51] Int. Cl.⁶ ................ H02K 7/14; H02K 7/09
[52] U.S. Cl. ...................... 310/90.5; 310/67 R
[58] Field of Search .................. 310/67 R, 90, 310/90.5; 359/198, 200, 877; 384/100, 107

[56] References Cited

U.S. PATENT DOCUMENTS

| 3,612,630 | 10/1971 | Rosensweig | 310/90.5 |
|---|---|---|---|
| 4,523,800 | 6/1985 | Yamashita et al. | 310/90 |
| 4,694,213 | 9/1987 | Gowda et al. | 310/90 |
| 4,726,640 | 2/1988 | Iwama et al. | 310/90.5 |
| 5,019,738 | 5/1991 | Weilbach et al. | 310/90.5 |
| 5,069,515 | 12/1991 | Itami et al. | 310/90 |
| 5,325,006 | 6/1994 | Uno et al. | 310/90 |

FOREIGN PATENT DOCUMENTS

| 588490 | 3/1994 | European Pat. Off. | 310/90.5 |
|---|---|---|---|
| 61-2915 | 1/1986 | Japan | 310/90.5 |
| 4-150753 | 5/1992 | Japan . | |
| 6-86503 | 3/1994 | Japan | 310/90.5 |

Primary Examiner—Clayton E. LaBalle
Attorney, Agent, or Firm—Antonelli, Terry, Stout & Kraus

[57] ABSTRACT

A motor has a stator with a base part and a hollow projection as well as a rotor with a shaft which extends into the hollow projection. A radial bearing is mounted between the shaft and the hollow projection. There may be a further radial bearing in the base part of the stator. The radial bearing, lubricated by magnetic fluid, is sealed between the shaft and the projection by a magnetic seal at the end of the hollow projection remote from the base part. The rotor has an annular part extending around the hollow projection, which supports permanent magnets forming an armature. Those permanent magnets interact with drive coils on the stator to cause rotation of the rotor about the axis of the shaft. There is also a magnetic thrust bearing between the annular part of the rotor and the projection of the stator. This magnetic thrust bearing is axially displaced relative to the magnetic seal towards the base part of the stator, to counteract the effect of the magnetic thrust bearing on the magnetic seal.

9 Claims, 3 Drawing Sheets 5,469,008

MOTOR WITH A BEARING LUBRICATED BY MAGNETIC FLUID

BACKGROUND OF THE INVENTION

The present invention relates to a motor having a bearing lubricated by a magnetic fluid. Such a motor may be used, for example, to rotate a polygon mirror, a magnetic disc, or an optical disc.

In JP-A-4-150753 there is disclosed a motor having a stator and a rotor, the stator having a base part and a projection projecting therefrom, and the rotor having a shaft extending into the projection. There is also a rotary bearing between the shaft and the inner wall of the projection, and the rotary bearing is lubricated by a magnetic fluid. To hold the magnetic fluid in the space between the shaft and the inner wall of the projection, a magnetic seal was provided at the end of the projection furthest from the base. An armature and drive coils respectively mounted on the rotor and stator form a drive means, so that the application of suitable drive currents to the rotor coils will cause the rotor to rotate relative to the stator about the rotation axis defined by the shaft.

In order to limit radial movement of the rotor relative to the stator, JP-A-4-150753 proposes that a magnetic thrust bearing be provided therebetween, the thrust bearing comprising first and second permanent magnets mounted respectively on the stator and rotor, and spaced in the radial direction. The polarities of the first and second permanent magnets were chosen so as generate a suitable force therebetween to resist radial movement of the rotor relative to the stator.

In JP-A-4-150753, the permanent magnet of the magnetic thrust bearing on the rotor was mounted on a radially outer surface thereof, and the permanent magnet on the stator was mounted on the inner surface of a cylindrical part of the stator which extended around the circumference of the rotor.

In the motor of JP-A-4-150753 discussed above, the fact that the stator had a cylindrical part extending circumferentially around the rotor, so that the first permanent magnet of the magnetic thrust bearing could be mounted thereon, had the effect of increasing the transverse dimensions of the motor. Therefore, consideration has been given to arrangements in which the rotor has an annular part extending around the projection of the stator which receives the shaft, so that the magnetic bearing may then be located between that projection and the annular part of the rotor.

In co-pending U.S. patent application Ser. No. 08/114176 (and corresponding European Application No. 93306377.8) a motor was described in which the magnetic thrust bearing was between the projection which received the rotor shaft and an annular part of the rotor surrounding that projection, with the magnetic thrust bearing being positioned radially outwardly of the magnetic seal and being axially aligned therewith.

However, it has been found that such an arrangement is not wholly satisfactory. The positioning of the magnetic thrust bearing and the magnetic seal generates magnetic flux therebetween, and the path of at least part of that flux is in the gap axially beyond the magnetic seal relative to the rotary bearing. As a result, forces are generated which act on the magnetic fluid, which is lubricating the rotary bearing. Such forces diminish the effect of the magnetic seal, increasing the risk of leakage of the magnetic fluid. This is undesirable because leakage of magnetic fluid may result in contamination of other components, such as a polygon mirror mounted on the rotor.

SUMMARY OF THE INVENTION

Therefore, the present invention proposes that the magnetic thrust bearing be axially displaced towards the base of the stator relative to the magnetic seal. This geometry reduces or eliminates any magnetic flux tending to weaken the effect of the magnetic seal, thereby reducing the risk of leakage.

In one form, the surface of the magnetic thrust bearing which is furthest from the base of the stator may be axially aligned with the surface of the magnetic seal which is closest to the base of the stator. However, there is preferably an axial gap between those surfaces. This increases the flux between the magnetic thrust bearing and the magnetic seal which tends to restrain the magnetic fluid within the gap between the shaft and the projection of the stator, thereby improving the leakage-prevention effect.

Normally, the magnetic seal is provided at the end (hereinafter the distal end) of the projection of the stator which is furthest from the base of the stator. It is then possible to form the magnetic seal on a separable part of the projection, forming that distal end, to assist in positioning of the seal. Furthermore, a viscous seal may be provided adjacent the magnetic seal, which viscous seal is preferably positioned axially closer to the base of the stator than the magnetic seal.

Preferably, the shaft extends into the base of the stator and a further rotary bearing, lubricated by the magnetic fluid, is provided at or adjacent to the end of the shaft within the base of the stator. The axial spacing of the magnetic bearing and the further magnetic bearing then limit torsional movement of the shaft.

Preferably, the permanent magnet on the stator, and the permanent magnet on the rotor, which form the magnetic thrust bearing are axially displaced by a short distance, as discussed in more detail in U.S. application Ser. No. 08/114176, the disclosure of which is incorporated herein by reference. As has been mentioned above, drive means which may be, for example, in the form of an armature and drive coils between the rotor and the shaft, generates forces on the rotor to cause it to rotate relative to the shaft. Such an armature and drive coils may be spaced axially or radially. The drive coils are normally mounted on the stator, and the armature on the rotor, but this is not essential.

BRIEF DESCRIPTION OF THE DRAWINGS

An embodiment of the present invention will now be described in detail, by way of example, with reference to the accompanying drawings, in which.

DETAILED DESCRIPTION

Figure 1:
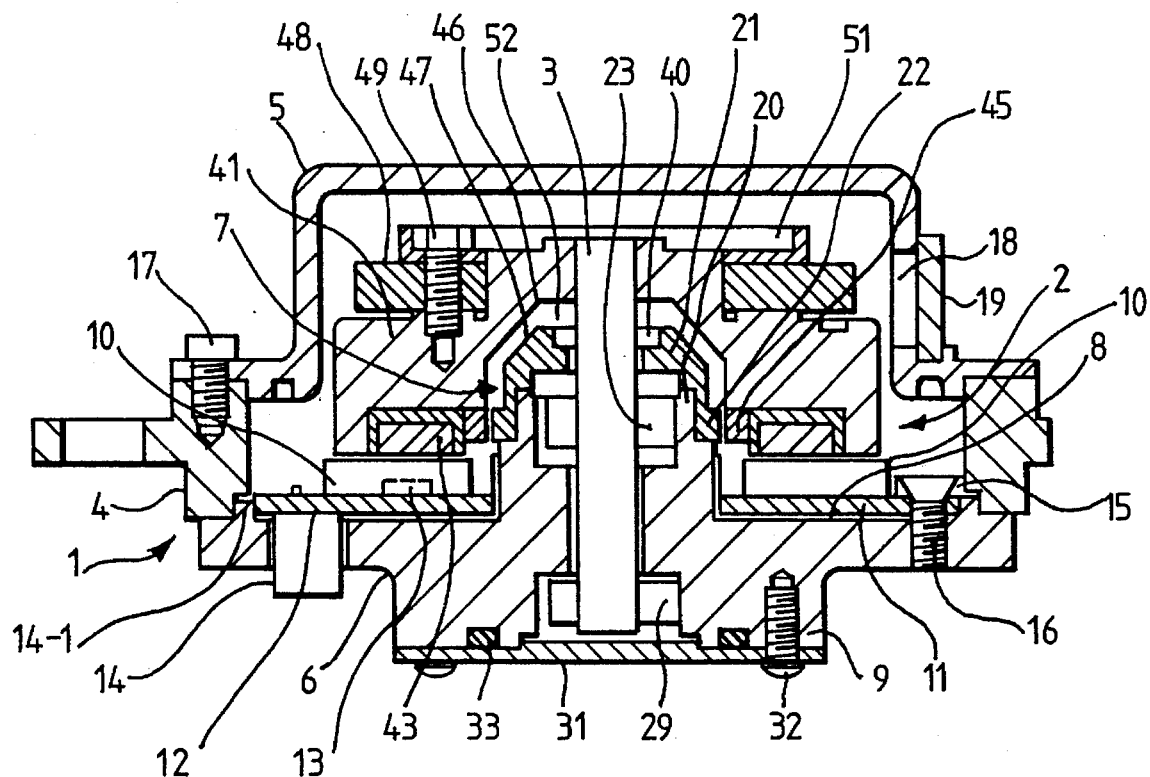
FIG. 1 is a longitudinal sectional view of a polygon mirror motor, forming an embodiment of the present invention.

The motor of the embodiment shown in the drawings is a mirror drive motor having a reflecting plate mounted thereon, and is generally called a polygonal mirror motor. This polygonal mirror motor may be used for a laser beam printer, as will be described later.

As shown in FIG. 1, rotor 2 is rotatably supported by a stator 1 via a rotary shaft 3. A housing 4 and a cover 5 are fitted to the stator 1 so as to cover the rotor 2. The stator 2 has a fixing support, forming a base 6 of the stator 1. A projection 7 is formed at the center of the upper surface of the base 6. This projection 7 is hollow and the rotary shaft 3 extends axially into the projection 7. The base 6 has a flat annual surface 8 around the outer periphery of the projection 7, and an annular part 9 at the center of the lower surface of the base 6. The rotary shaft 3 then extends through the projection 7 into hollow interior of the annular part 9.

A plurality of aligned stator coils (drive coils) 10 are attached to the flat surface 8 via a yoke 11 on the stator 1. There is an insulating plate 12 between the stator coils 10 and the flat surface 8. The yoke 11 forms a magnetic circuit and is made of an iron material. The stator coils 10 are flat, with a fan shape. There is no iron core for the magnetic circuit at the center of each stator coil 10. Instead, there is an air core containing a rotor position detecting element 13 for detecting the position of the rotor 2. A connector 14 connects the stator coils 10 and the rotor position detecting element 13 to the exterior of the rotor, e.g. to permit a drive current to be applied to the stator coils 10.

There is also a positioning ring 14-1 on the upper surface of the outer peripheral side of the base, against which abuts the radially outer surface of the yoke 11. The housing 4 on the upper surface of the base 6 engages the positioning ring 14-1. The housing 4 is fastened to the base 6 by screws 16 through fixing legs 15 provided on the housing 4, and this fastening also secures the insulating plate 12. The inner periphery of the housing 4 is circular, and encloses the outer periphery of the stator coils 10 and a part of the outer periphery of the rotor 2.

The cover 5 is fitted to the upper part of the housing 4 and is fastened by screws 17. Both the housing and the cover 5 are made of aluminum. The inner periphery of the cover 5 is circular and encloses the outer periphery of the rotor 2. The top surface of the cover 5 covers the upper surface of the rotor 2. Since the inside of the rotor 2 and the stator 1 is covered by the housing 4 and the cover 5, dust cannot enter and adhere to the inside of the rotor 2 and the stator 1. A window 18 is formed in the cover 5, the window 18 being covered by a transparent lid 19.

The projection 7 extending from the base 6 of the stator comprises a cylindrical part 20 which is integral with the base 6 and a distal end part 21 on the free end of the cylindrical part 20. The distal end 21 is molded separately from the cylindrical part 20, is made of aluminum, and is fixed to the cylindrical part 20 using adhesive or screws.

A permanent magnet 22 on the stator, which forms part of a magnetic thrust bearing, is located axially below the distal end 21, and extends around the outer periphery of the cylindrical part 20. In this embodiment, the permanent magnet 22 is fixed to the cylindrical part 20 using adhesive. The permanent magnet 22 is a strong and large magnet of sintered neodymium. Its magnetic force is about 10,800 Gauss.

Figure 3:
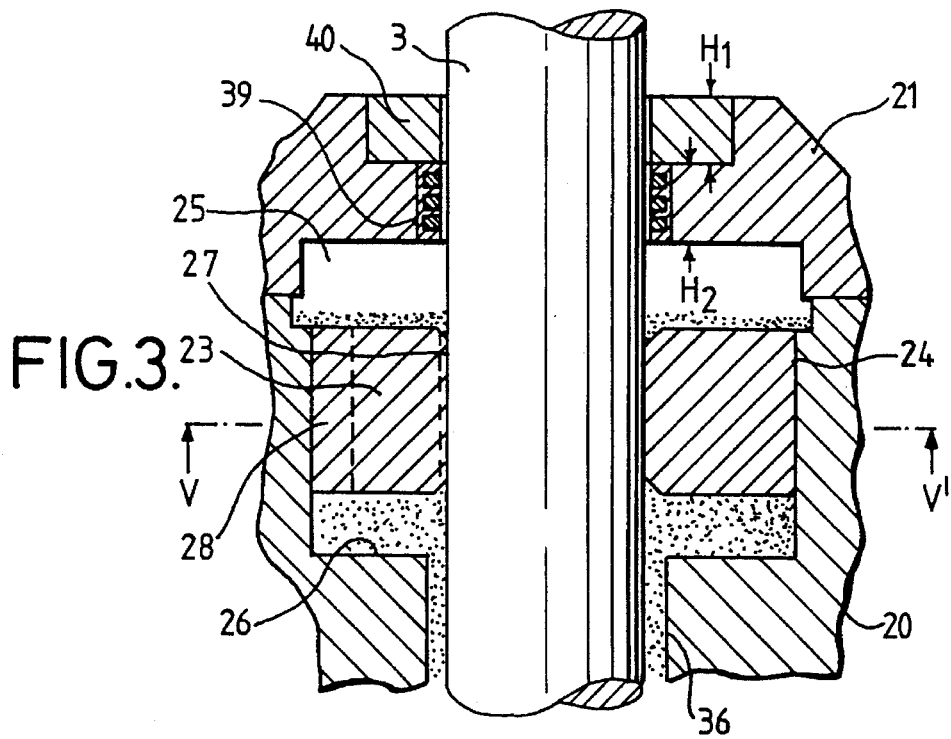
FIG. 3 is a longitudinal sectional view showing an upper radial bearing of the motor of FIG. 1.
Figure 4:
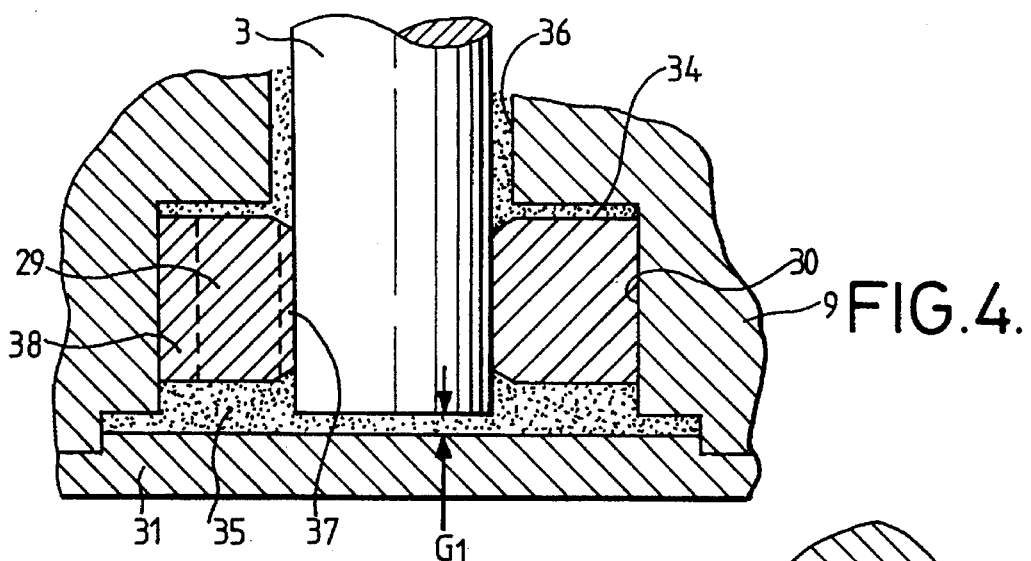
FIG. 4 is a longitudinal sectional view showing a lower radial bearing of the motor of FIG. 1.
Figure 5:
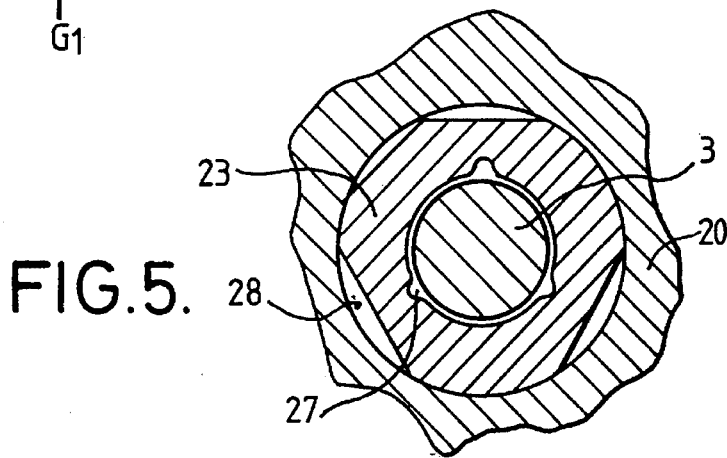
FIG. 5 is a sectional view along the line V—V in FIG. 3.

There are radial bearings between the shaft 3 and the stator 2. These radial bearings will be described with reference to FIGS. 3, 4 and 5. FIG. 3 shows the upper radial bearing and FIG. 4 shows the lower radial bearing. FIG. 5 is a sectional view along the line V—V' in FIG. 3.

The upper radial bearing 23, shown in FIGS. 3 and 5, is received in an upper radial bearing accommodation chamber 24, which is formed between the cylindrical part 20 and the shaft 3. The upper radial bearing accommodation chamber 24, forms an air reservoir space 25 above the upper radial bearing 23 and a fluid reservoir space 26 for the upper radial bearing 23 below the upper radial bearing 23. The upper part of the air reservoir space 25 is bounded by the distal end part 21.

There is a sliding gap between the inner peripheral surface of the upper radial bearing 23 and the outer periphery of the shaft 3, and this gap is filled with lubricating oil. The width of the gap is between 3 and 5 µm. There are three fluid feed grooves 27 in the inner periphery of the upper radial bearing 23. These fluid feed grooves 27 extend from the upper surface to the lower surface of the upper radial bearing 23. There are also three fluid circulation holes 28 in the outer periphery of the upper radial bearing 23. These fluid circulation ports 28 extend from the upper surface to the lower surface of the upper radial bearing 23.

The lower radial bearing 29 is located within the annular part 9 of the base 6. As shown in FIG. 4, the lower radial bearing 29 is mounted on the radially inner wall 30 of the annular part 9. A bottom lid 31 is secured to the lower surface of the annular part 9 by screws 32 and sealed thereto by a seal 33. A fluid reservoir upper space 34 is defined above the lower radial bearing 29 and a fluid reservoir lower space 35 is defined below the lower radial bearing 29. The lower radial bearing 29 is positioned within the annular part 9 so that the fluid reservoir lower space 35 is greater than the fluid reservoir upper space 34. There is a fluid communication hole 36 linking the fluid reservoir upper space 34 for the lower radial bearing 29 to the fluid reservoir space 26 for the upper radial bearing 23 between the cylindrical part 20 and the outer periphery of the shaft 3.

There is a gap between the inner peripheral surface of the lower radial bearing 29 and the outer periphery of the rotary shaft 3, which gap is filled by the lubricating oil. The width of the gap is 3 to 5 µm. Fluid feed grooves 37 for the lower radial bearing and fluid circulation holes 38, which are similar to those of the upper radial bearing 23, are defined in the inner peripheral surface of the lower radial bearing 29 and in its outer peripheral surface, respectively. There is also a gap $G_1$ between the lower end of the rotary shaft 3 and the bottom lid 31 is 0.5 mm. This gap $G_1$ is defined by the operation of the magnetic thrust bearing, to be discussed in more detail later.

The distal end 21 of the projection 7 supports a dynamic pressure seal 39 (viscous seal) and a magnetic seal 40 for sealing the magnetic fluid. The dynamic pressure seal 39 and the magnetic seal 40 extend completely around the circumference of the shaft 3.

As shown on FIG. 3, the dynamic pressure seal 39 is located above the air reservoir space 25 and the magnetic seal 40 for sealing the magnetic fluid is located above the dynamic pressure seal 39. There is a gap between the inner periphery of the magnetic seal 40, for magnetic fluid and the outer periphery of the rotary shaft 3 with a width between 50 and 100 µm. There is also a gap between the dynamic pressure seal 39 and the outer periphery of the shaft 3, again having width between 50 and 100 µm. In this embodiment, the diameter of the shaft 3 is 5 mm. The height $H_1$ of the magnetic seal 40 is about 2 mm and the height $H_2$ of the dynamic pressure seal 39 is about 3 mm.

The upper edge of the magnetic seal 40 is an N pole and its lower edge is an S pole, but this polarity may be reversed. The magnetic seal 40 is ring-like, and may be molded from a mixture of ferrite particles and plastic. The magnetic force of the magnetic seal 40 is preferably about 2,500 Gauss and a weak magnet is used.

The dynamic pressure seal 39 is preferably integral with the distal end 21. A helical groove is defined in the inner peripheral surface of this dynamic pressure seal 39 and this helical groove extends towards the air reservoir space 25 in the direction of rotation of the shaft 3.

Figure 2:
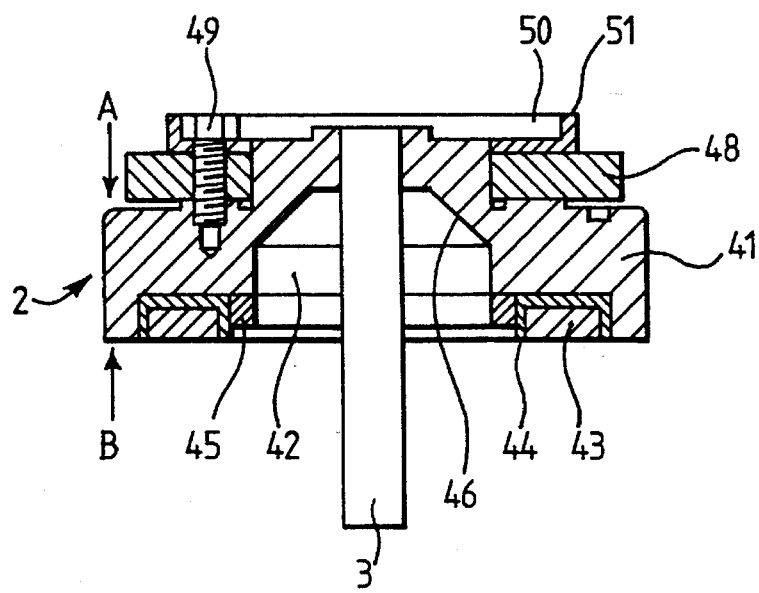
FIG. 2 is a longitudinal sectional view of the rotor of the motor of FIG. 1.

The structure of the rotor 2 is shown in more detail in FIG. 2. The rotor 2 has an annular part 41 of aluminum which is connected to the shaft 3 with a cavity 42 being defined between the annular part 41 and the shaft 3. There is a permanent magnet 43, forming an armature, in a lower surface of the annular part 41. This permanent magnet 43 is connected to the annular part 43 by a yoke 44. The permanent magnet 43 is ring-like, and its flat lower surface is flush with the lower surface of the annular part 41. When the motor is assembled, the lower surface of this permanent magnet 43 is adjacent the upper surface of the stator coils 10. The permanent magnet 43 may be fixed to the yoke 44 using adhesive, and the yoke 44 may also be fixed to the annular part 41 using adhesive.

There is another permanent magnet 45 (which, together with the permanent magnet 22 on the stator 1, forms a magnetic thrust bearing) which is positioned on the inner periphery of the yoke 44. The permanent magnet 45 is cylindrical, and its inner periphery is flush with the inner periphery of the cavity 42. The permanent magnet 45 may be fixed to the annular pare 41 using adhesive. A strong and large magnet is used for the permanent magnet 45, similar to the permanent magnet 22 on the stator.

As shown in FIG. 2, there is an inclined inner wall 46 at the upper part of the cavity 42. When the motor is assembled, this inclined wall 46 is positioned adjacent an inclined outer wall 47 of the distal end 21 of the projection 7.

A polygon mirror 48 is fastened to the upper part of the annular part 41 by screws 49. A balancer 50 is fitted to the upper surface of the polygonal mirror 48, and secured thereto by the screws 49. The polygon mirror 48 is of aluminum, and the reflecting surface of its outer periphery is precisely finished. The balancer 50 has a pan shape with an outer annular wall 51.

The annular part 41 is well balanced so that it can withstand high speed rotation. Balance correction for the annular part 41 is carried out before the polygonal mirror 48 is fitted. The balance correction is effected by cutting off upper and lower portions A, B near the outer periphery of the annular part 41. Then, the polygonal mirror 48 is fitted to the annular part and another balance correction is made by applying adhesive to inner peripheral corners of the wall 51 of the balancer 50. These two balance corrections are carried out on the basis of imbalance detected by a balancing machine.

The provision of the inclined inner surface 46 means that the thickness of the portion for supporting the polygonal mirror 48 and the height of the cavity 42 is increased, and so the rotor is strengthened. Also, the overall height of the rotor 2 is reduced.

After the rotor 2 is assembled and its balance corrected, it is fitted to the stator 1. The shaft 3 is inserted into the lower radial bearing 29 and the upper radial bearing 23, which are filled with the magnetic fluid. Prior to this, the stator is filled with a suitable amount of magnetic fluid, as a lubricating fluid. The cover 5 is then fitted to complete the assembly of the motor. As can be seen in FIG. 1, there is a gap 52 between the projection 7 of the stator 1 and the cavity 42 of the rotor 2.

The upper and lower radial bearings 23, 29 are lubricated by the magnetic fluid, as shown in FIGS. 3 and 4. The fluid reservoir upper and lower spaces 34, 35 for the lower radial bearing 29 above and below the lower radial bearing 29, the fluid communication hole 36, and the fluid reservoir space 26 for the upper radial bearing of the upper radial bearing 23 are all filled with the magnetic fluid. The amount of magnetic fluid is sufficiently small that the magnetic fluid only just covers the top of the upper radial bearing 23. Hence, the reservoir space 25 above the upper radial bearing 23 is filled with air, not magnetic fluid.

After the rotor 2 is fitted to the stator 1, the lower end of the shaft 3 is spaced from the bottom lid 31 by gap $G_1$. This is due to the operation of the magnetic thrust bearing, which will now be described in detail.

Figure 7:
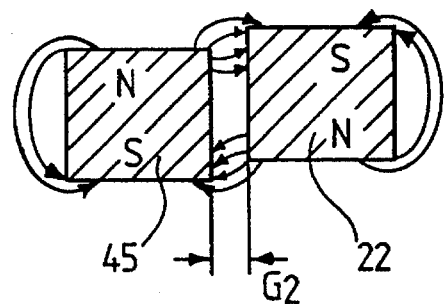
FIG. 7 is an enlarged view of the magnetic thrust bearing of the motor of FIG. 1.

As shown in FIG. 7, the magnetic thrust bearing is formed by the permanent magnet 22 on the stator and the permanent magnet 45 on the rotor. The radially outer face of the permanent magnet 22 and the radially inner face of the permanent magnet 45 are opposed with a gap $G_2$ therebetween. This gap $G_2$ is about 0.5 mm. The upper surface of the permanent magnet 22 is a South pole and its lower surface is a North pole. The upper surface of the permanent magnet 45 is a North pole and its lower surface is a South pole. Hence, the permanent magnet 22 on the stator side and the permanent magnet 45 on the rotor side attract each other because their unlike poles face one another. Due to this magnetic attraction, the permanent magnet 45 is prevented from separating from the permanent magnet 22. Accordingly, axial movement of the rotor 2 is restricted, and hence the gap $G_1$ can be maintained.

The magnetic thrust bearing is located such that the permanent magnet 45 on the rotor is slightly lower than the permanent magnet 22 on the stator. In this state, the gap $G_1$ is defined. The reason for this is that the permanent magnet 43 for the armature is attracted to the yoke 11 on the stator. When the motor is vertical, the weight of the rotor 2 itself is added to the attraction described above, and the permanent magnet 45 on the rotor is shifted downward a little. The gap $G_1$ corresponds to the state where the force due to the magnetic thrust bearing in the axial direction and the force of attraction by the permanent magnet 43 in the axial direction are balanced.

The magnetic fluid used in the present embodiment contains fine powder of iron. The iron powder preferably has a grain size of 0.01 μm, and the amount of the iron powder is around 45% wt. Surface activity is applied to iron powder, and a negative charge (–) surrounds each iron particle. Since the iron particles then repulse one another, they are distributed uniformly in the lubricating oil. This magnetic fluid tends to evaporate at about 80° C.

Figure 8:
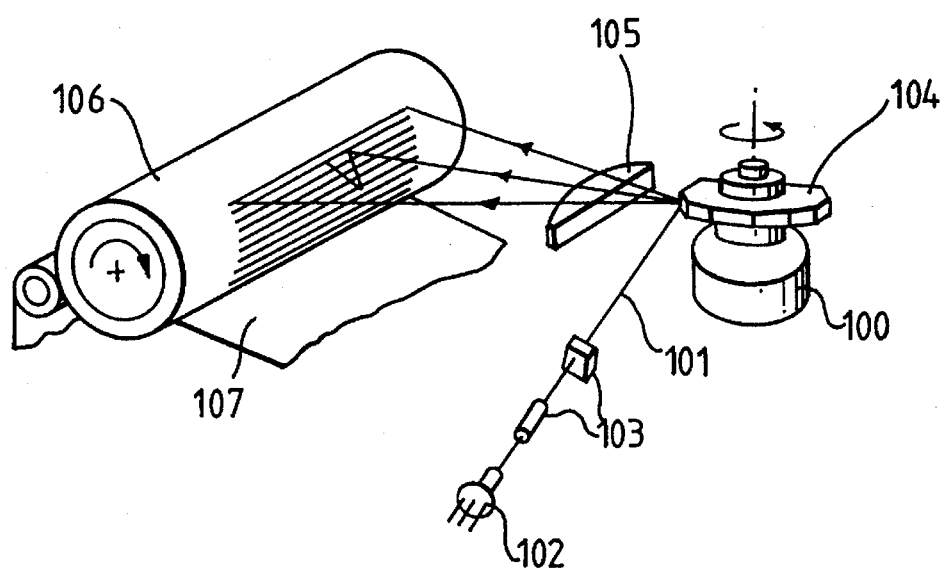
FIG. 8 is a schematic view of the optical system of a laser beam printer, in which a motor according to the present invention may be used.

The foregoing description is directed to the structure of the embodiment of the present invention. Next, the operation of the embodiment will be described. In operation, the motor is orientated as shown in FIG. 8.

When power, e.g. a suitable drive current, is applied to the stator coils 10 of the motor, the rotor 2 rotates. Some polygon mirror motors make tens of hundreds to tens of thousands of revolutions per minute, and the motor of the present embodiment may achieve such high speed rotation. The polygon mirror motor is used for optical scanning of a laser beam printer. A laser beam which is modulated by laser signals is reflected and scanned by the polygon mirror. This reflected laser beam can then be made to print characters and figures.

The motor rotates smoothly because the gap between the upper radial bearing 23 and the shaft 3 and the gap between the lower radial bearing 29 and the shaft 3 are filled with magnetic fluid. The magnetic fluid passes into the gaps in the upper and lower radial bearings 23 and 29 through the fluid feed grooves 27, 37 for the upper and lower radial bearings 23, 29 and through the fluid circulation holes 28, 38 for the upper and lower radial bearings 23, 29. The circulation of the magnetic fluid is such that it flows downwards through the fluid feed grooves 27, 37 for the upper and lower radial bearings 23, 29 and flows upwards through the fluid circulation holes 28, 38 for the upper and lower radial bearings 23, 29. The magnetic fluid passes around the rotary shaft 3 due to the rotation of the rotary shaft 3.

The flow of the magnetic fluid around the upper radial bearing 23 will now be described in detail. However, the flow of the magnetic fluid around the lower radial bearing 29 is similar and so will not be described. As can be seen from FIG. 3, there is only a small amount of magnetic fluid above the upper part of the upper radial bearing 23. On the other hand, the fluid reservoir space 26 is filled with magnetic fluid. Hence, it is found that there is a tendency for the magnetic fluid to move upwardly axially with respect to the shaft 3 from the fluid reservoir space 26 to the space above the upper radial bearing 23.

The magnetic fluid that ascends along the surface of the shaft 3 due to the rotation of the shaft 3 is returned by the dynamic pressure seal 39. There is a helical groove in the dynamic pressure seal 39 which extends towards the air reservoir space 25 in the direction of rotation of the shaft 3. Accordingly, the dynamic pressure seal 39 returns the magnetic fluid which ascends with the rotation of the rotary shaft 3.

In addition to the ascent of the magnetic fluid described above, the pressure inside the air reservoir space 25 of the upper radial bearing 23 rises. This is due to expansion of the air inside the air reservoir space 25 and evaporation of magnetic fluid due to the temperature of the motor. Even though this pressure rises, the magnetic fluid (including its evaporated component) does not generally pass through the dynamic pressure seal 39 because the returning action of the dynamic pressure seal 39 is strong. However, when the pressure rise becomes too great, some of the evaporated magnetic fluid passes through the dynamic pressure seal 39 and reaches the magnetics seal 40. This magnetic fluid is then caught by the magnetic seal 40.

Figure 6:
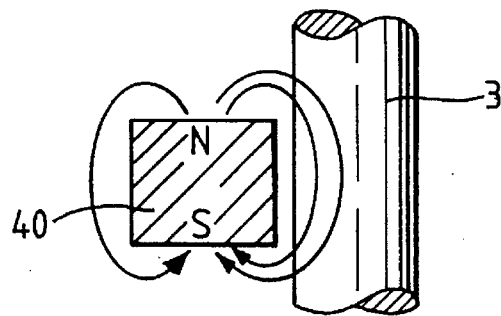
FIG. 6 is an enlarged view of the magnetic seal for sealing a magnetic fluid in the upper radial bearing shown in FIG. 3.

As shown in FIG. 6, a magnetic path is formed through the iron shaft 3 from the magnetic seal 40 and the magnetic fluid is caught by this magnetic force in the gap between the magnetic seal 40 and the shaft 3. Hence, it is very unlikely that the magnetic fluid will leak further.

Occasionally, magnetic fluid exists inside the dynamic pressure seal 39 and the magnetic seal 40 before the operation of the motor. This may be due, for example, to flow of magnetic fluid into the gap between the dynamic pressure seal 39 and the shaft 3 and into the gap between the magnetic seal 40 and the shaft 3 due to the vibration of the motor during transportation, or when the motor is placed sideways. Even in such cases, the magnetic fluid is caught by the magnetic seal 40 and does not leak out.

As described above, the magnetic fluid does not leak outside the bearing device. This is important because the magnetic fluid should be kept away from the polygon mirror to prevent contamination thereof.

As has been mentioned previously, the permanent magnets 22 and 45 forming the magnetic thrust bearing are strong magnets, but the magnet forming the magnetic seal 40 is relatively weak. The position of the magnetic thrust bearing may therefore affect the performance of the magnetic seal 40. In particular, it has been found that the arrangement described in U.S. application Ser. No. 08/114176 (European Patent Application No. 93306377.8) is unsatisfactory. In That arrangement, the magnetic thrust bearing was axially aligned with the magnetic seal, with the magnetic thrust bearing being axially spaced from the magnetic seal, but extending around it in a circumferential direction. Hence, magnetic flux was generated between the magnets of the magnetic seal and the magnetic thrust bearing, and that magnetic flux had significant components in the upward direction in FIG. 1, i.e. outwardly from the gap between the magnetic thrust bearing and the shaft. This was found to weaken the sealing effect of the magnetic seal, thereby increasing the risk of leakage of the magnetic fluid.

Therefore, in accordance with the present invention, as shown in FIG. 1, the magnetic thrust bearing is mounted between the stator 1 and rotor 2 so that it is axially displaced relative to the magnetic seal 40. Thus, in the position shown in FIG. 1, the magnetic thrust bearing is axially below the magnetic seal 40. It has been found that, with such an arrangement, the sealing effect of the magnetic seal 40 is not weakened by the magnetic thrust bearing.

Thus, the magnetic thrust bearing is axially displaced from the magnetic seal 40 for sealing the magnetic fluid. It is disposed below the slant inner peripheral part 46 of the cavity 42. The permanent magnet 45 on the rotor is proximate of the lower end of the annular part 41 of the rotor, with the permanent magnet 22 on the stator facing it. The magnetic thrust bearing, formed by the permanent magnets 45 and 22, is far from the magnetic seal 40 for sealing the magnetic fluid. Therefore, the influence of the magnetic attraction of the magnetic thrust bearing on the magnetic seal 40 is small.

If the magnetic thrust bearing is near the magnetic seal 40, and in particular if they are axially aligned, the influence of the magnetic attraction of the magnetic thrust bearing on the magnetic seal 40 will be greater. Then, the magnetic fluid that is caught by the magnetic seal 40 will be attracted towards the magnetic thrust bearing, and this is not desirable.

Within the present invention, it is possible for the upper surface of the magnetic thrust bearing (which, as can be seen from FIG. 7, is the upper surface of the permanent magnet 22 on the rotor) to be aligned with the lowermost surface of the magnetic seal 40. However, as shown in the embodiment of FIG. 1, the magnetic thrust bearing is preferably mounted on the outer surface of the cylindrical part 20 of the projection 7, so that it is as far as practical from the magnetic seal 40.

The minimum, and optimum, axial spacing of the magnetic thrust bearing and the magnetic seal 40 will depend on the specific geometrical arrangement, strength of magnets, etc. The basic principle is that the magnetic flux of the permanent magnets 22, 45 of the magnetic thrust bearing should not significantly affect the magnetic flux generated by the magnetic seal, at least in the region approximate to the shaft 30 where sealing is to occur. If this condition is not met, the magnetic fluid which is attracted toward the magnetic seal may also be attracted towards the magnets 22, 45 of the magnetic thrust bearing, resulting in leakage. If the magnetic flux due to the magnets 22, 45 of the magnetic thrust bearing is sufficiently small in the vicinity of the magnetic seal 40 this will not happen When considering this factor, it is preferable that the conditions chosen reflect the fact that the motor may sometimes be inverted. Then, the force of gravity increases the risk of leakage, and therefore the motor should be designed so that the sealing effect of the magnetic seal is sufficient to resist such gravity-induced leakage, and the effect of the magnets 22, 45 of the magnetic thrust bearing will not affect this.

Furthermore, in the embodiment shown in FIG. 1, the magnetic thrust bearing is lower than the upper part of the upper radial bearing 23, i.e. the upper part of the permanent magnet 22 on the stator is lower than the upper part of the upper radial bearing 23. The magnetic force of the magnetic thrust bearing magnetically attracts the magnetic fluid (inclusive of its evaporated components) downwardly at the upper side of the upper radial bearing 23, and helps to prevent the leakage of the magnetic fluid. Since the magnetic thrust bearing is axially displaced relative to the magnetic seal 40 for sealing the magnetic fluid, it does not deteriorate the performance of the magnetic seal 40.

As shown in FIG. 1, and as described in more detail in U.S. application Ser. No. 08/114176 (the disclosure of which is incorporated herein by reference), the permanent magnet 45 on the rotor of the magnetic thrust bearing abuts on the inner peripheral side of the annular part 41 of the rotor, with its outer periphery surrounded by the yoke 44. Therefore, the structure is strong. The permanent magnet 45 on the rotor is normally a sintered magnet of neodymium, and is brittle and has a low tensile strength. However, since it is bounded on its outer periphery by the yoke 44, no damage to the permanent magnet 45 occurs even when a strong centrifugal force acts on it due to rotation of the motor at tens or thousands of revolutions per minute.

Of course, many variations of the above embodiment are possible within the present invention. For example, in the embodiment in FIG. 1, the permanent magnet 43 forming the armature and the stator coils 10 are axially spaced. Arrangements are also possible in which these components are radially spaced.

Though the embodiment described above is directed to a polygon mirror motor, a motor of similar structure can also be used as a motor for driving, e.g. a magnetic disk, an optical disk, or a VTR. In addition, it can also be used as a driving motor for a fine spinning frame. In any of such machines and devices, leakage of the magnetic fluid must be avoided, as in the case of a polygon mirror motor.

FIG. 8 shows a construction wherein a polygon mirror motor 100 corresponding, e.g. to the embodiment in FIG. 1, is used in the optical system of a laser beam printer. A laser beam 101 emitted from a laser beam diode 102 and focussed by lenses 103 is deflected by a polygon mirror 104. The beam then passes through an image formation lens 105 and is incident on a photosensitive drum 106. By suitable modulation of the laser beam 101, a latent image can be formed on the photosensitive drum 106. Rotation of the polygon mirror 104 by the motor 100 causes the beam to scan the photosensitive drum, and rotation of that photosensitive drum enables the image to be built-up. The image thus formed may be transferred to a sheet of paper 107.

What is claimed is:

1. A motor comprising:

a stator having a base part and a hollow projection projecting from said base part;

a rotor having a shaft and an annular part, said rotor being positioned with respect to said stator so that said annular part of said rotor extends around said hollow projection of said stator and said shaft of said rotor extends into said hollow projection of said stator towards said base of said stator and is rotatable relative thereto about a rotation axis;

drive means for applying a rotative force to said rotor relative to said stator to rotate said rotor about said rotation axis;

a radial bearing mounted between said shaft and said hollow projection of said stator;

magnetic fluid disposed between said shaft and said hollow projection of said stator for lubrication of said radial bearing;

a magnetic seal mounted between said shaft and said hollow projection of said stator for sealing said magnetic fluid, said magnetic seal being further from said base part of said stator than said radial bearing in the direction of said rotation axis; and a magnetic thrust bearing mounted between said hollow projection of said stator and said annular part of said rotor, said magnetic thrust bearing being axially disposed towards said base part of said stator in the direction of said rotation axis relative to said magnetic seal.

2. A motor according to claim 1, further including a viscous seal provided said shaft and said hollow projection of said stator.

3. A motor according to claim 1, wherein said magnetic thrust bearing comprises a first permanent magnet mounted on said rotor and a second permanent magnet mounted on said stator.

4. A motor according to claim 3, wherein said first and second permanent magnets are concentrically arranged about said rotation axis and have a radial gap therebetween;

5. A motor according to claim 3, wherein said first permanent magnet is displaced in the direction of said rotation axis relative to said second permanent magnet.

6. A motor according to claim 1, wherein an armature is separated from drive coils mounted on said stator in a direction parallel to said rotation axis.

7. A motor according to claim 1, wherein an armature is mounted on said rotor and drive coils are mounted on said stator.

8. A motor according to claim 1, wherein said shaft extends into said base part of said stator, and there is a further radial bearing disposed between said shaft and said base part of said stator.

9. A motor according to claim 1, in combination with a polygon mirror, said polygon mirror being mounted on said rotor.

\* \* \* \* \*